J. H. MORGAN.
SAW FOR CUTTING WOOD, METAL, OR OTHER SUBSTANCES.
APPLICATION FILED NOV. 24, 1919.

1,381,930. Patented June 21, 1921.

Witnesses:
Chas. E. Whiteman.
H. D. Penney

Inventor:
John Henry Morgan,
By his Att'y,
F. H. Richards

UNITED STATES PATENT OFFICE.

JOHN HENRY MORGAN, OF HARROGATE, ENGLAND.

SAW FOR CUTTING WOOD, METAL, OR OTHER SUBSTANCES.

1,381,930. Specification of Letters Patent. Patented June 21, 1921.

Application filed November 24, 1919. Serial No. 340,365.

*To all whom it may concern:*

Be it known that I, JOHN HENRY MORGAN, a subject of the King of Great Britain, residing in Harrogate, Yorkshire, England, have invented certain new and useful Improvements in Saws for Cutting Wood, Metal, or other Substances, of which the following is a specification.

This invention relates to saws for cutting wood, metal or other substances.

With the saws at present in use, in order to provide a clearance to facilitate the passage of the saw through the material, the alternate teeth are set or inclined somewhat out of the plane of the blade in opposite directions. The setting of the teeth, however, somewhat impairs the cutting power of the saw.

The present invention has for its object certain improvements in saws, whereby while the necessary clearance is obtained to facilitate the passage of the saw through the material, the full or substantially full cutting efficiency of the saw is preserved.

In accordance with this invention, in place of so arranging or setting the teeth of the saw, that they alternately incline in opposite directions, the teeth are set so that some are oppositely inclined from the bases while others are not set. Thus for example one tooth is set to the right, the next one has no set while the next tooth is set to the left, and so on throughout the length of the saw.

In order that the invention may be the better understood drawings are appended in which:—

Figure 1:
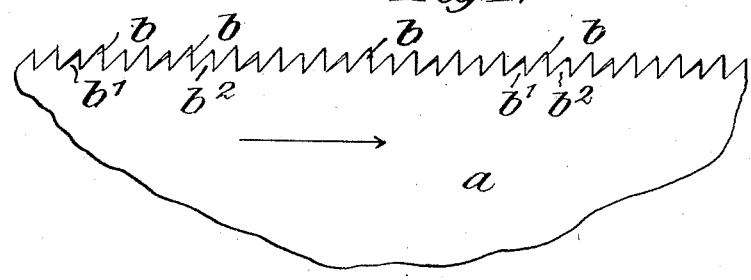
Figure 1 is a side view of part of a saw blade.
Figure 2:
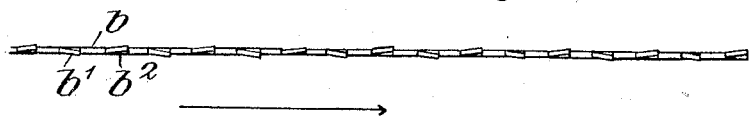
Fig. 2 is a plan, and looking in the direction of the arrow of Fig. 1.
Figure 3:
Fig. 3 is an end view to an enlarged scale, looking in the direction of the arrow of Fig. 2.

Referring to the accompanying drawings $a$ indicates the blade of the saw, the teeth of which, as is shown more clearly in Figs. 2 and 3, are so set that while certain of the said teeth indicated by $b$ are in the plane of the blade, those $b^1$ on one side incline laterally in one direction, while those indicated by $b^2$ incline in the opposite direction, the teeth $b$ being set slightly "proud" or elevated above the level of the teeth $b^1$ and $b^2$, the teeth $b$ coming first into operation to form the channel and the teeth $b^1$ and $b^2$ enlarging said channel for permitting the teeth $b$ to travel without binding.

By this means while the full cutting effect of the straight teeth $b$ is preserved, the oppositely inclined teeth, $b^1$ $b^2$, by acting to form a groove which is wider than the thickness of the blade, provide a sufficient clearance for the discharge of the particles of material which otherwise would act to choke the groove, thereby requiring the exercise of a superfluous amount of force to operate the saw.

A further advantage attending the arrangement of the teeth in the manner described is that the tendency of the saw to wander when starting the cut or when cutting is reduced, the teeth set to one side as it were balancing the tendency to wander created by those set to the other side, and the intermediate straight teeth having a chisel edge and acting as routers.

The invention may equally well be applied to band saws, circular or any other class of saw in which a setting is given to the teeth.

Claims:

1. A saw for cutting wood, metal or other substances, having a blade comprising teeth lying wholly in the plane of the blade and teeth inclined to the plane of the blade, each tooth lying wholly in the plane of the blade being intermediate of two teeth inclined to the plane of the blade in opposite direction to each other.

2. A saw for cutting wood, metal or other substances, having a blade comprising teeth lying wholly in the plane of the blade and teeth inclined to the plane of the blade, each tooth lying wholly in the plane of the blade being intermediate of two teeth inclined to the plane of the blade in opposite direction to each other, and said intermediate tooth lying wholly in the plane of the blade being provided with a chisel edge and acting as a router.

3. A saw for cutting wood, metal or other substances, having a blade comprising teeth lying wholly in the plane of the blade and teeth inclined to the plane of the blade in direction opposite to each other, each tooth lying wholly in the plane of the blade being intermediate of two teeth inclined to the plane of the blade in opposite direction to each other, the teeth lying wholly in the plane of the blade being arranged above the level of the inclined teeth to come first into operation for forming the channel, and the inclined teeth enlarging the channel for permitting the teeth lying wholly in the plane of the blade to travel without binding.

4. A saw for cutting wood, metal or other substances, having a blade comprising teeth lying wholly in the plane of the blade and teeth inclined to the plane of the blade in opposite direction to each other, each tooth lying wholly in the plane of the blade being intermediate of two teeth inclined to the plane of the blade in opposite direction to each other and being provided with a chisel edge to act as a router, the teeth lying wholly in the plane of the blade being arranged above the level of the inclined teeth to come first into operation for forming the channel, and the inclined teeth enlarging the channel for permitting the teeth lying wholly in the plane of the blade to travel without binding.

In testimony whereof I affix hereunto my signature in the presence of two witnesses.

J. H. MORGAN.

Witnesses:
M. EVANS JACKSON,
B. NIBLETE.